United States Patent
Eusterwiemann

(10) Patent No.: US 11,548,058 B2
(45) Date of Patent: Jan. 10, 2023

(54) RIVET ELEMENT SUPPLY UNIT

(71) Applicant: Broejte-Automation GmbH, Rastede (DE)

(72) Inventor: Christoph Eusterwiemann, Oldenburg (DE)

(73) Assignee: Broetje-Automation GmbH, Rastede (DE)

(*) Notice: Subject to any disclaimer, the term of this patent is extended or adjusted under 35 U.S.C. 154(b) by 443 days.

(21) Appl. No.: 16/612,826

(22) PCT Filed: Mar. 15, 2018

(86) PCT No.: PCT/EP2018/056528
§ 371 (c)(1),
(2) Date: May 20, 2020

(87) PCT Pub. No.: WO2018/206184
PCT Pub. Date: Nov. 15, 2018

(65) Prior Publication Data
US 2020/0282449 A1    Sep. 10, 2020

(30) Foreign Application Priority Data

May 12, 2017 (DE) ...................... 10 2017 110 408.9
Jul. 5, 2017 (DE) ...................... 10 2017 114 971.6

(51) Int. Cl.
*B21J 15/32* (2006.01)
*B21J 15/28* (2006.01)
(Continued)

(52) U.S. Cl.
CPC ............... *B21J 15/32* (2013.01); *B21J 15/28* (2013.01); *B25J 11/007* (2013.01); *B21J 15/02* (2013.01);
(Continued)

(58) Field of Classification Search
CPC ... B21J 15/02; B21J 15/10; B21J 15/28; B21J 15/32; Y10T 29/49943; Y10T 29/49956;
(Continued)

(56) References Cited

U.S. PATENT DOCUMENTS 913,134 A * 2/1909 Hill ..................... G07F 11/44
2,186,841 A   1/1940 Rylander
(Continued)

FOREIGN PATENT DOCUMENTS

CN    2361605 W    2/2000
CN    105346989    2/2016
(Continued)

OTHER PUBLICATIONS

"German Search Report," for Priority German Patent Application No. 102017114971.6 dated Mar. 21, 2018 (8 pages).
(Continued)

*Primary Examiner* — Jermie E Cozart
(74) *Attorney, Agent, or Firm* — Pauly, DeVries Smith & Deffner LLC

(57) ABSTRACT

Various embodiments relate to a rivet element supply unit for providing rivet elements, wherein the rivet element supply unit comprises a rivet element provision unit and a handling unit, wherein the rivet element provision unit for conveying the rivet elements comprises a spiral conveyor having a longitudinal axis and a spiral, which extends around the longitudinal axis, wherein the longitudinal axis is inclined to the direction of gravity, wherein the rivet element provision unit has a pick-up region to which the spiral conveyor supplies rivet elements and from which the handling unit picks up the rivet elements for transporting to a rivet element receptacle.

29 Claims, 5 Drawing Sheets

(51) Int. Cl.
  *B25J 11/00*   (2006.01)
  *B21J 15/02*   (2006.01)
  *B21J 15/10*   (2006.01)
  *B21J 15/14*   (2006.01)
  *B65G 3/04*   (2006.01)
  *B65G 11/06*   (2006.01)
  *B65G 11/12*   (2006.01)

(52) U.S. Cl.
  CPC .............. *B21J 15/10* (2013.01); *B21J 15/142* (2013.01); *B65G 3/04* (2013.01); *B65G 11/066* (2013.01); *B65G 11/126* (2013.01); *Y10T 29/49943* (2015.01); *Y10T 29/49956* (2015.01); *Y10T 29/53478* (2015.01); *Y10T 29/53522* (2015.01)

(58) Field of Classification Search
  CPC .......... Y10T 29/53478; Y10T 29/53522; B25J 11/007; B65G 3/04; B65G 11/066; B65G 11/126
  USPC .................................................. 221/188, 277
  See application file for complete search history.

(56) References Cited

U.S. PATENT DOCUMENTS

| | | | |
|---|---|---|---|
| 4,208,153 | A | 6/1980 | Trethewy |
| 4,960,360 | A | 10/1990 | Giannuzzi et al. |
| 9,238,556 | B2 * | 1/2016 | Kühn .................... F16L 11/121 |
| 2011/0290848 | A1 | 12/2011 | Wenzel et al. |

FOREIGN PATENT DOCUMENTS

| | | |
|---|---|---|
| CN | 105363989 W | 3/2016 |
| CN | 205837913 W | 12/2016 |
| DE | 3144304 | 6/1983 |
| DE | 10336665 | 3/2005 |
| DE | 102006036981 | 2/2008 |
| DE | 102008051489 | 4/2010 |
| DE | 102012212502 | 10/2013 |
| DE | 102015216093 | 3/2017 |
| EP | 0618022 | 10/1994 |
| EP | 0995537 | 4/2000 |
| JP | 2014117751 W | 6/2014 |
| WO | 2008124353 | 10/2008 |
| WO | 2018206184 | 11/2018 |

OTHER PUBLICATIONS

"International Search Report and Written Opinion," for PCT Application No. PCT/EP2018/056528 dated Jun. 29, 2018 (24 pages) with English translation.

International Preliminary Report on Patentability for PCT Application No. PCT/EP2018/056528 dated Nov. 12, 2019 (8 pages).

"First Office Action," for CN Patent Application No. 201880043704.3 dated Mar. 12, 2021 (13 pages) English Translation Only.

\* cited by examiner

RIVET ELEMENT SUPPLY UNIT

CROSS-REFERENCE TO RELATED APPLICATIONS

This application is a national stage application under 35 U.S.C. 371 of International Patent Application Serial No. PCT/EP2018/056528, entitled "Rivet Element Supply Unit," filed Mar. 15, 2018, which claims priority from German Patent Applications No. DE 10 2017 110 408.9, filed May 12, 2017, and DE 10 2017 114 971.6, filed Jul. 5, 2017, the disclosures of which are incorporated herein by reference.

FIELD OF THE TECHNOLOGY

Various embodiments relate to a rivet element supply unit for providing rivet elements, a manufacturing device with a rivet machine, a rivet loading station, and a method for providing rivet elements.

BACKGROUND

It is known from the prior art that rivet elements for filling a rivet cassette are supplied separately by a rivet element provision unit configured as a vibrating spiral conveyor, their alignment is checked, and the rivet elements are then supplied to a rivet cassette. The longitudinal axis of the vibrating spiral conveyor extends in the direction of gravity and the spiral is configured to be spiral-shaped with an upwardly increasing radius.

A filled rivet cassette is then supplied to a rivet magazine of a manufacturing device from where the rivet machine of the manufacturing device is supplied with rivet elements.

The filling of the rivet cassettes is relatively complex and mostly takes place sequentially here. If the type of rivet element, which are to be inserted into the rivet cassettes, is changed, the rivet loading station must be adjusted mechanically to the new rivet elements. The concept of providing the rivet elements in rivet magazines requires a comprehensive pre-planning and storage of rivet cassettes with various rivet elements.

SUMMARY

It is therefore the object of the present disclosure to enable a simple, cost-effective, and flexible supply of a rivet machine with the required rivet elements.

This object is achieved in a rivet element supply unit having various features described herein.

By providing a rivet element supply unit with a rivet element provision unit and a handling unit, a particularly simple and flexible supply of the rivet machine with the required rivet elements can be achieved. It is proposed that the rivet element provision unit for conveying the rivet elements comprises a spiral conveyor having a longitudinal axis and a spiral, which extends around the longitudinal axis. In order to also enable separation in a particularly simple manner, the longitudinal axis is inclined to the direction of gravity, with the result that the rivet elements can be conveyed and separated in a simple manner by turning the spiral. A vibrating drive is not necessary for the spiral conveyor.

Furthermore, the rivet element provision unit has a pick-up region to which the spiral conveyor supplies the rivet elements. From the pick-up region the handling unit picks up the rivet elements for transporting to a rivet element receptacle, in particular robot-based. The handling unit enables the rivet elements to be picked up so that these can be supplied in an aligned manner, in particular in a stabilized position, to the rivet element receptacle.

In various embodiments, the rivet element provision unit can have a plurality of spiral conveyors, preferably for different rivet elements. By this means, the handling and provision of different rivet elements with a rivet element supply unit can be achieved in a particularly simple manner.

In various embodiments, the rivet element supply unit can have a spiral pot for receiving rivet elements. In this way, the rivet element supply unit can be simply filled by pouring rivet elements in the form of bulk material into the said spiral pot. The spiral pot can thus be used both to stockpile rivet elements in the form of bulk material and also to separate the rivet elements.

In various embodiments, the spiral pot can be received in the rivet element supply unit by a spiral pot receptacle and can be arranged therein, in particular detachably. A rotational movement can then be transmitted from a motor to the spiral pot via a coupling. In this case, the spiral pot can easily be removed for refilling of rivet elements and/or simply exchanged for another.

Further developments of the rivet element supply unit are described herein.

In various embodiments, the handling unit is a robot. This enables a quite particularly simple pick-up and alignment of the rivet elements so that these can be supplied in an aligned manner to a rivet element receptacle.

In various embodiments, the rivet element supply unit can have a controller for controlling the rivet element provision unit and/or the handling unit. In conjunction with a sensor arrangement, it is thus possible to detect the position and/or the alignment of the rivet elements in the pick-up region.

Furthermore, the initially mentioned object is achieved in a manufacturing device with a rivet machine as described herein.

The same advantages are obtained as described previously in connection with the rivet element supply unit.

In various embodiments, the rivet machine has an adjusting unit and an end effector, wherein the end effector comprises a rivet tool.

According to some embodiments, the rivet element receptacle receives the rivet elements in an aligned manner, and/or comprises an intermediate store.

Various forms of the configuration of the transport section from the rivet element receptacle to the rivet machine which enable a particularly simple transport of the rivet elements are described herein.

Furthermore, the initially described object is achieved in a rivet loading station by features described herein.

The same advantages are obtained as already described previously in connection with the rivet element provision unit or the manufacturing device.

Various embodiments of the rivet loading station are described herein.

Finally, the initially mentioned object is achieved by a method for providing rivet elements having various features described herein.

The same advantages are obtained as described previously in connection with the rivet element provision unit, the manufacturing device or the rivet loading station. The described rivet element provision unit, the described manufacturing device or the described rivet loading station can be used for carrying out the method.

Various embodiments provide a rivet element supply unit for providing rivet elements, wherein the rivet element supply unit comprises a rivet element provision unit and a handling unit, wherein the rivet element provision unit for conveying the rivet elements comprises a spiral conveyor having a longitudinal axis and a spiral, which extends around the longitudinal axis, wherein the longitudinal axis is inclined to the direction of gravity, wherein the rivet element provision unit has a pick-up region to which the spiral conveyor supplies rivet elements and from which the handling unit picks up the rivet elements for transporting to a rivet element receptacle.

In some embodiments, the rivet element provision unit comprises a plurality of spiral conveyors having a longitudinal axis, the spirals of which extend around their respective longitudinal axis, wherein the longitudinal axes of at least two, or of all the spiral conveyors are inclined to the direction of gravity, such as the longitudinal axes of at least two, further all the spiral conveyors can be inclined in the same direction, in particular are directed parallel to one another.

In some embodiments, the spiral conveyor has a spiral pot for receiving rivet elements, in which the spiral is arranged, such as the spiral pot is configured to be substantially cylindrical.

In some embodiments, the spiral pot and the spiral are configured in one piece and/or the spiral has a substantially constant radius.

In some embodiments, the spiral conveyor has a spiral pot receptacle for receiving the spiral pot, such as the spiral pot, is arranged in particular tool-free, detachably in the spiral pot receptacle.

In some embodiments, a coupling, in particular a claw coupling is provided for the transmission of a rotary movement from a motor onto the spiral pot, such as the spiral conveyor has a motor which drives the spiral pot.

In some embodiments, the spiral conveyor, in particular the spiral pot receptacle and/or the spiral pot have an opening for supplying a rivet element to the pick-up region.

In some embodiments, the rivet element provision unit has a slide via which the spiral conveyor or the spiral conveyors supply rivet elements to the pick-up region.

In some embodiments, the pick-up region is formed by a vibrating table.

In some embodiments, the handling unit is a robot, such as the handling unit is a robot with at least two, or at least three, rotational axes.

In some embodiments, a controller is provided for controlling the rivet element provision unit and/or the handling unit, such as the controller detects by means of a sensor arrangement, in particular an optical sensor, the position and/or alignment of the rivet elements in the pick-up region and on the basis of the position and/or alignment of the rivet elements the controller activates the handling unit, in particular the robot, to receive the rivet elements.

Various embodiments provide a manufacturing device with a rivet machine, in particular for processing aircraft structural components, wherein the manufacturing device comprises a rivet element supply unit as described herein and a rivet element receptacle.

In some embodiments, the rivet machine comprises an adjusting unit and an end effector, wherein the end effector comprises a rivet tool, such as the end effector comprises a drilling tool and a rivet tool.

In some embodiments, the rivet element receptacle receives the rivet elements, in an aligned manner, in particular in a stabilized position and/or the rivet element receptacle comprises an intermediate store for intermediate storage of rivet elements.

In some embodiments, at least a part of the transport section from the rivet receiving receptacle to the rivet machine, in particular the adjusting unit and/or the end effector is hose-bound.

In some embodiments, a rivet switch is provided on the transport section, such as a rivet switch is provided on the transport section between the rivet element receptacle and the adjusting unit.

Various embodiments provide a rivet loading station with a rivet element supply unit as described herein and a rivet element receptacle, wherein the rivet loading station is adapted to transport the rivet elements at least partially on the transport section from the pick-up region to a rivet element receptacle by means of the handling unit.

In some embodiments, the rivet loading station comprises a rivet cassette receptacle for receiving a rivet cassette. In some embodiments, the rivet loading station comprises the rivet cassette receptacle or the rivet cassette comprises the rivet element receptacle.

In some embodiments, the rivet element receptacle receives the rivet elements, in an aligned manner, in particular in a stabilized position and/or the rivet element receptacle comprises an intermediate store for the intermediate storage of rivet elements.

Various embodiments provide a method for providing rivet elements by means of a rivet element supply unit, such as described herein, wherein the rivet elements are conveyed by means of a screw conveyor to a pick-up region and are picked up from the pick-up region by the handling unit for transporting to a rivet element receptacle.

BRIEF DESCRIPTION OF THE DRAWINGS

Hereinafter various aspects are explained in detail by means of drawings showing merely one exemplary embodiment. In the drawings

DETAILED DESCRIPTION

Figure 1:
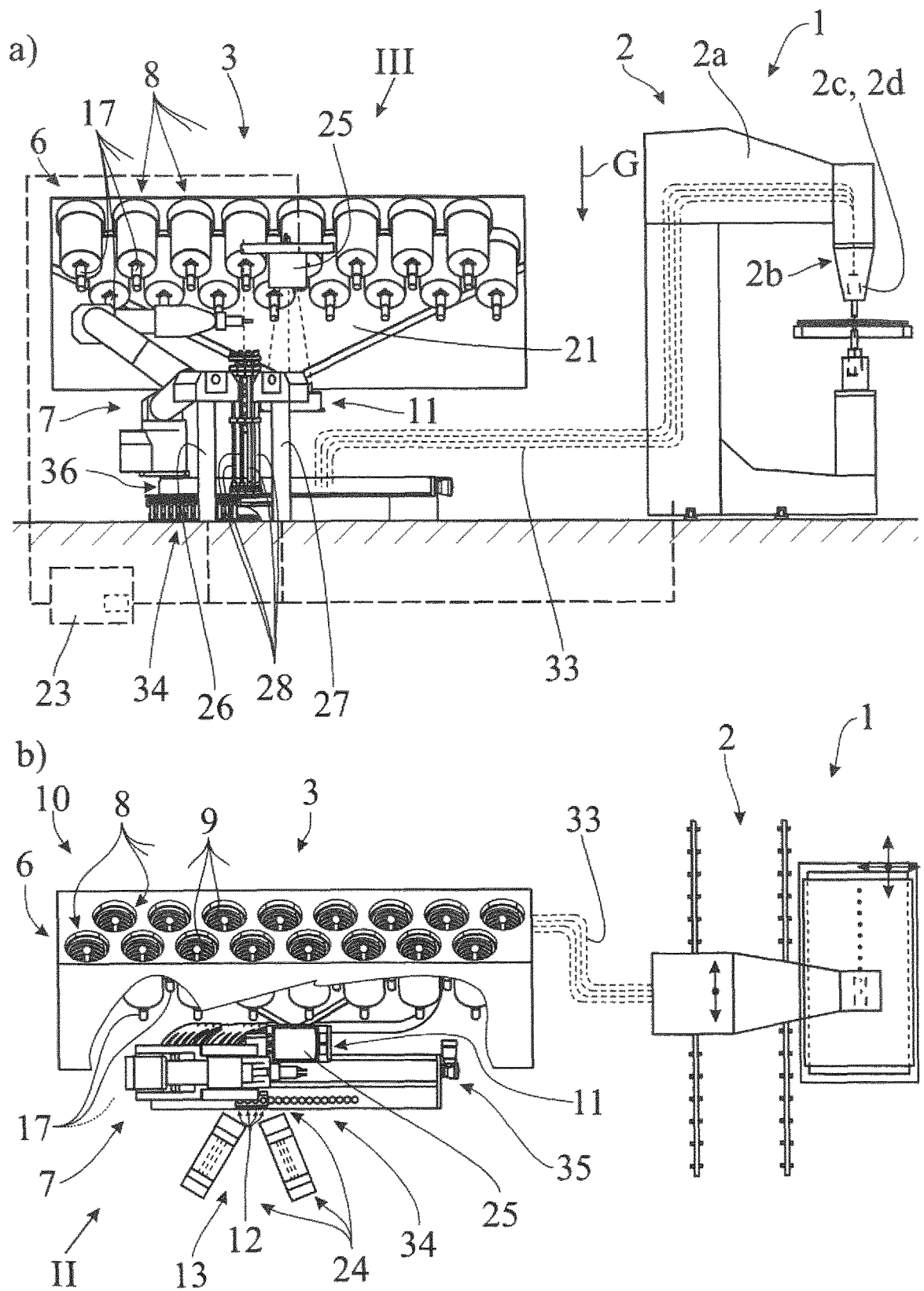
FIG. 1 shows a schematic diagram of a proposed manufacturing device for carrying out a proposed method in a) a side view and b) a plan view.

FIG. 1 shows a proposed manufacturing device 1. The manufacturing device 1 comprises a rivet machine 2 and a rivet element supply unit 3.

In the exemplary embodiment the rivet machine 2 is used for processing structural components 4, in particular aircraft structural components, for example, a fuselage section and/or an outer skin section of an aircraft.

In some embodiments, the rivet machine 2, as shown in FIG. 1, has an adjusting unit 2a with an end effector 2b. The end effector 2b has a rivet tool 2c for setting rivet elements 5 in a structural component 4 and possibly a drilling tool 2d for drilling a hole in a structural component 4. The rivet tool 2c can then insert a rivet element 5 into a hole drilled by the drilling tool 2d.

The proposed rivet element supply unit 3 has a rivet element provision unit 6 and a handling unit 7 for providing rivet elements 5.

Figure 3:
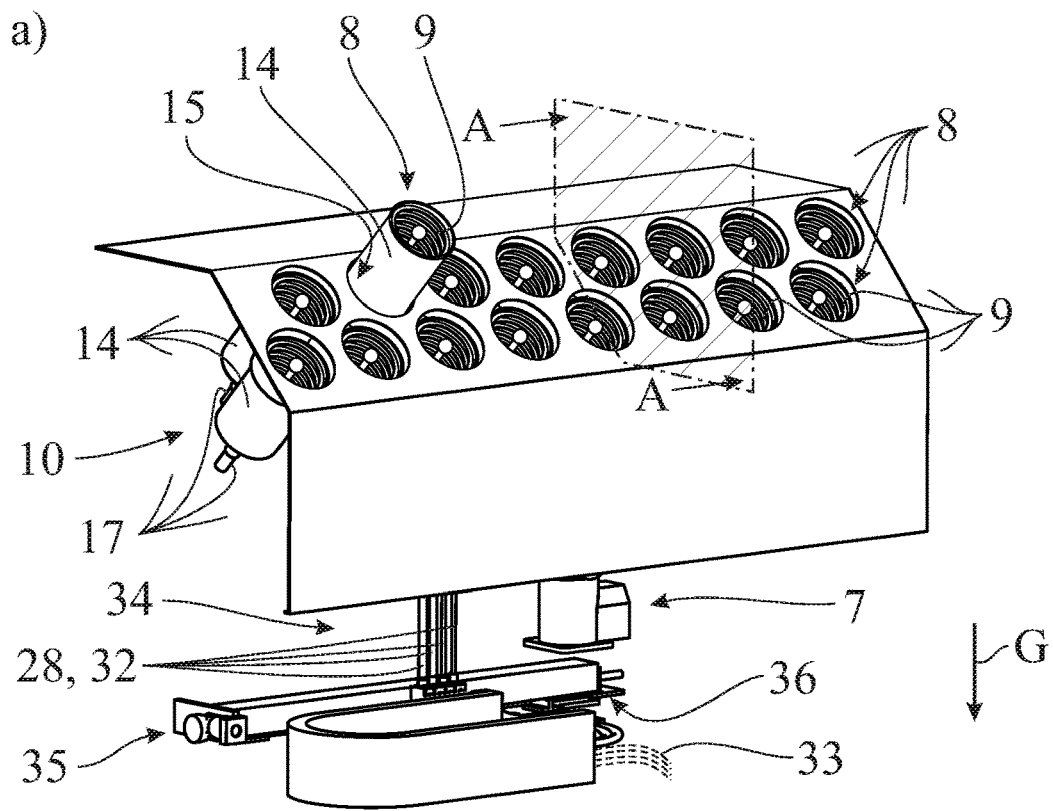
FIG. 3 shows a) a three-dimensional diagram of a part of the proposed rivet element supply unit according to viewing direction III from FIG. 1 and in b) a section according to A-A from FIG. 3a, FIG. 4 shows a schematic diagram of a proposed rivet loading station for carrying out a proposed method in a) a side view and b) a plan view.
Figure 3:
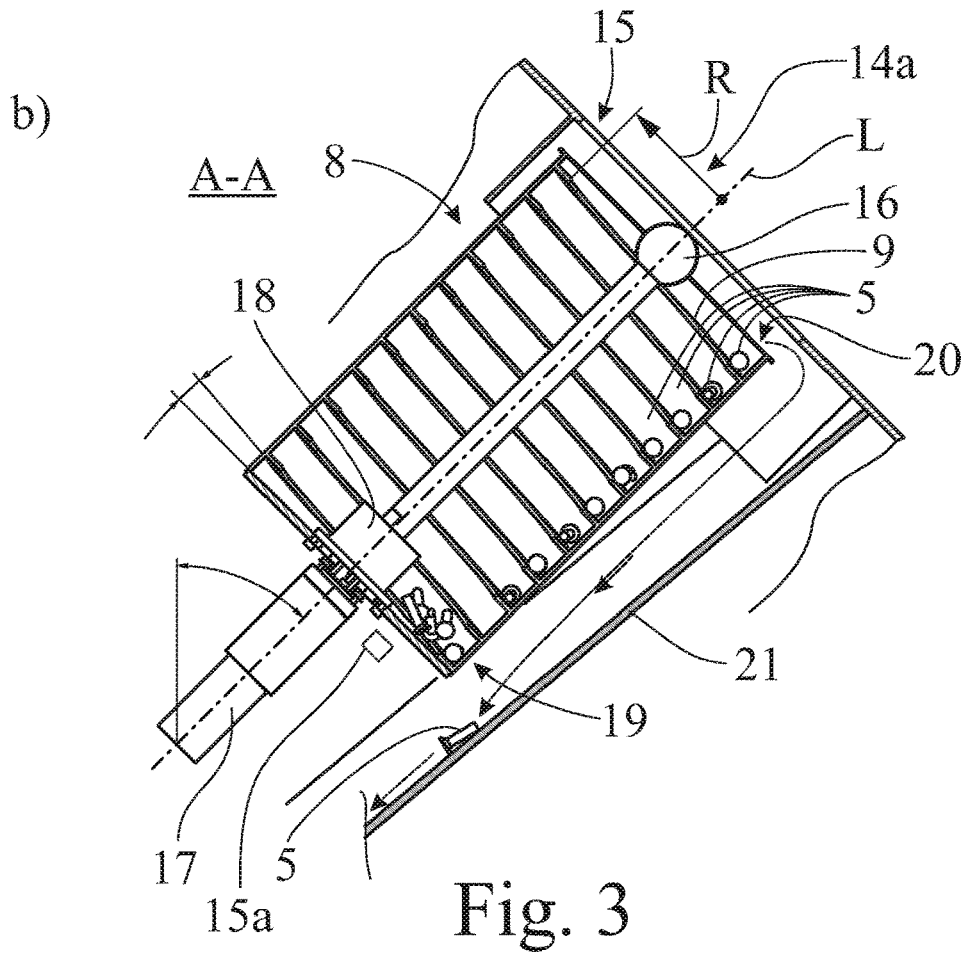

For conveying the rivet elements 5 the rivet element provision unit 6 has a spiral conveyor 8. The spiral conveyor 8 has a spiral 9 and a longitudinal axis L about which the spiral 9 extends. When used in normal operation, the spiral conveyor 8 is arranged in such a manner that the longitudinal axis L is inclined to the direction of gravity G, as shown in FIGS. 1 and 3.

In particular, in order to provide rivet elements 5 of the most diverse type and/or of the most diverse genre, the rivet element provision unit 6 can comprise a plurality of spiral conveyors 8, as is the case in the exemplary embodiment. If several spiral conveyors 8 are provided, these form a spiral conveyor arrangement 10. In the additional spiral conveyors 8 the spiral 9 thereof also extends about its respective longitudinal axis L. In this case, the longitudinal axes L of at least two, such as all the spiral conveyors 8, can be inclined to the direction of gravity G. Here, as can be readily seen in FIGS. 1 and 3 respectively, the longitudinal axes L of the spiral conveyors 8 are aligned substantially parallel to one another. A quite particularly compact arrangement is obtained. Particularly the spiral conveyors 8 of a rivet element provision unit 6 are configured to have substantially the same structure.

The longitudinal axis L or the longitudinal axes L can run at an angle of 15° to 75°, such as 30° to 60° or 40° to 50°, to the direction of gravity G.

The pitch angle of the spiral can be less than 20°, or less than 10°. Particularly the pitch angle can be between 2.5° and 7.5°. In the exemplary embodiment it is 5°.

It is further proposed that the rivet element provision unit 6 has a pick-up region 11, to which the spiral conveyor 8 supplies rivet elements 5.

The handling unit 7 transports, here robot-based, the rivet elements 4 from the pick-up region to a rivet element receptacle 12. The rivet element supply unit 3 can thus supply the rivet elements 5 particularly flexibly to a rivet element receptacle 12, in particular in an aligned manner. As shown in the exemplary embodiment, a plurality of rivet element receptacles 12 can also be provided. These then form a rivet element receiving arrangement 13.

In order to enable a particularly flexible supply, the handling unit 7 can be a robot. Here, the robot is a robot with at least two or at least three axes. The robot can also have four or more axes. Particularly the robot can have at least two or at least three axes of rotation. Particularly the robot can be an industrial robot, in particular a Scara robot (Selective Compliance Assembly Robot Arm). It is also designated as "horizontal articulated arm robot". In the exemplary embodiment of FIG. 5 this is fastened in a suspended manner on an in particular fixed portal 7a.

Since a robot here removes the rivet elements 5 from the rivet element provision unit 6 and supplies them to a rivet element receptacle 12, many different rivet elements 5 can be handled in a simple manner and supplied to the rivet element receptacle 12 or the rivet element receptacles 12, in particular in an aligned manner. The rivet element receptacle 12 can then receive the rivet elements 5 in an aligned manner, in particular in a stabilized position.

If the rivet elements 5 are supplied to the rivet element receptacle 12 in an aligned manner, their alignment no longer needs to be checked before receiving into the rivet element receptacle 12 and in the case of an incorrect alignment, these rivet elements therefore also do not need to be rotated or returned to the rivet element provision unit 6.

The rivet elements 5 can, for example, be rivets 5a and/or rivet collars and/or spacers.

In various embodiments, rivets 5a of different genre, in particular of different type, and/or of different nominal length and/or different nominal diameter can be supplied with the handling unit 7 without varying the mechanical configuration of the rivet element supply unit 3 of one of the or the rivet element receptacles 12. The type of rivet element 5 differs in this respect from its genre in that the genre determines the type of rivet 5a, rivet collar, and/or spacer but is not specified with regard to the dimension of its features, in particular with regard to its nominal dimensions. The type of a rivet element 5 not only specifies the genre but also the nominal dimensions of the rivet element 5, i.e. in particular the nominal diameter and the nominal length.

Additionally or alternatively rivet collars of different genre, in particular of different type and/or different nominal length, and/or different nominal diameter can be supplied by the handling unit 7 without varying the mechanical configuration of the rivet element supply unit 3 of one of the or the rivet element receptacles 12.

It is therefore also possible to supply rivets 5a and rivet collars by the handling unit 7 without varying the mechanical configuration of the rivet element supply unit 3 of one of the or the rivet element receptacles 12.

The same applies here also for spacers. Spacers of different genre, in particular of different type and/or different nominal length, and/or different nominal diameter can be supplied by the handling unit 7 without varying the mechanical configuration of the rivet element supply unit 3 of one of the or the rivet element receptacles 12.

This can be the rivet element receptacle 12 of a proposed manufacturing device 1 and/or a rivet element receptacle 12 of a rivet element cassette and/or a rivet element receptacle 12 of a rivet cassette receptacle. In the last two cases the rivet element supply unit 3 can form a proposed rivet loading station 1a jointly with the rivet element cassette and/or rivet element cassette receptacle.

The combination of the rivet element provision unit 6 with a spiral conveyor 8 combined with the handling unit 7 enables a particularly flexible supply of rivet elements 5 to a rivet element receptacle 12. The spiral conveyor 8 enables a quite particularly simple separation and supply to the pick-up region 11 while the handling unit 7 can then supply the rivet elements 5, in particular of most diverse genre or of most diverse type, in an aligned manner to the rivet element receptacle 12. The rivet element receptacle 12 can then receive these in an aligned manner, in particular in a stabilized position.

A mechanical configuration change of the rivet element supply unit 3 to adapt to other rivet elements 5 is not necessary.

An enlarged diagram of a spiral conveyor 8 can be seen from FIG. 3b according to section A-A. The spiral conveyor 8 has a spiral pot 14 for receiving rivet elements 5.

The spiral 9 is arranged in this. The spiral pot 14 is here configured to be substantially cylindrical. It has proved particularly successful if the spiral pot 14 and the spiral 9 are formed in one piece and/or the spiral 9 has a substantially constant radius R, as is the case in the exemplary embodiment.

The spiral pot 14 enables the spiral conveyor 8 to supply rivet elements 5 in the form of bulk material. This can then be stockpiled in the bottom region of the spiral conveyor 8—stockpiling region. Due to the rotation of the spiral 9, the rivet elements 5 can be transported by the spiral 9 from the stockpiling region in the direction of the inlet opening 14a of the spiral conveyor 8. The rivet elements 5 thereby slide on the spiral 9. In addition, the rivet elements 5 are thereby separated on the spiral 9, at least into groups.

As shown in FIG. 3a, the spiral conveyor 8 has a spiral pot receptacle 15 for receiving the spiral pot 14. Here the spiral pot 14 is arranged, in particular without tools, detachably in the spiral pot receptacle 15. Here, as shown in FIG. 3, it can be simply inserted into the spiral pot receptacle 15 or withdrawn from it. This enables a particularly simple refilling of rivet elements 5. The spiral pot 14 can be simply removed and then filled with rivet elements 5. Then it can be inserted into the spiral pot receptacle 15 again. Alternatively, the spiral pot 14 can be exchanged for another, already filled, spiral pot 14. This enables an even speedier refilling of the rivet element provision unit 6 with rivet elements 5.

Furthermore, the spiral conveyor 8, a spiral pot receptacle 15, the majority of the spiral pot receptacles 15, or each spiral pot receptacle 15 can have a spiral pot sensor 15a, which detects whether a spiral pot 14 is received and/or which rivet elements 5 are located in the spiral pot 14. This detection is here made via a characterization of the spiral pot 14 which is sensed by the spiral pot sensor 15a. This can, for example, be a barcode, QR code and/or an RFID chip.

In order to facilitate the removal of the spiral pot 14, the spiral pot 14 has a handle 16 for gripping and removing the spiral pot 14 from or inserting the spiral pot 14 into the spiral pot receptacle 15. Here the handle 16 is arranged on the longitudinal axis L of the spiral conveyor 14 in the spiral pot 14. It is configured as a ball head.

A coupling 18 can be provided to transmit a rotational movement from a drive 17 to the spiral pot 14 or the spiral pots 14. The coupling 18 here is a claw coupling, which in particular is configured as a plug coupling. For this purpose the spiral pot 14 has a claw unit and the spiral pot receptacle 15 has a corresponding claw unit of the coupling 18.

Here each spiral conveyor 8 has its own drive 17. Accordingly, all the spiral conveyors 8 here can be individually actuated and driven. Alternatively however, it is also feasible that a drive 17 is provided for several spiral conveyors 8. In this case, the drive force of one drive 17 can, for example, be transmitted by means of a belt, toothed belt or similar from the drive 17 to several spiral conveyors 8.

The spiral 9 is also turned by the driving of the spiral pot 14. The turning of the spiral 9 has the effect that the rivet elements 5 are conveyed from the stockpiling region 19 of the spiral pot 14 through the spiral 9 in the direction of the opening of the spiral pot 14. Here the opening of the spiral pot 14 is located on the upper front side of the same. On the conveying path in the spiral pot 14 the rivet elements 5 are separated in particular into small groups. By this means, by turning the spiral pot 14 it is possible to achieve an in particular single ejection of the rivet elements 5, here via an ejection edge of the spiral pot 14, from the spiral pot 14.

Here and in particular as can be seen in FIG. 3, the rivet elements 5 are conveyed through the spiral 9 from the spiral conveyor 8. Here the spiral pot receptacle 15 has an opening 20 for supplying the rivet elements 5 to the pick-up region. Through this opening 20 the rivet elements 5 fall out from the spiral conveyor 8. Here a slide 21 is then provided via which the rivet elements 5 slide to the pick-up region 11. In this respect, due to a rotation of the spiral 9 a rivet element 5 is supplied from the spiral conveyor 8 to the pick-up region 11 by ejecting the same and sliding over the slide 21.

Figure 5:
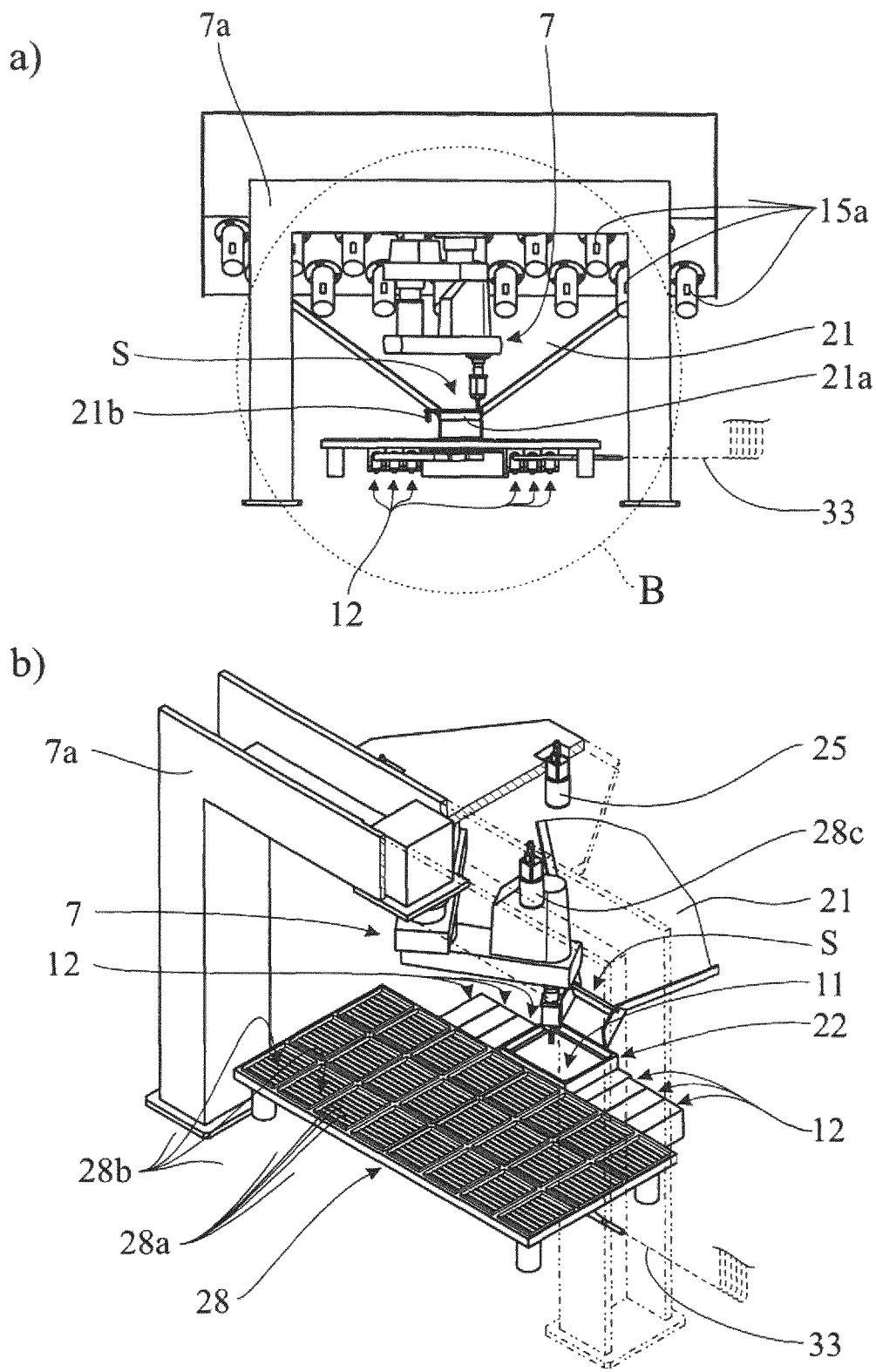
FIG. 5 shows a schematic diagram of a further exemplary embodiment of a proposed rivet element supply unit for carrying out a proposed method a) in a side view and b) in a perspective view.

As shown, for example, in FIG. 5, a rivet element collecting region S can be provided in front of the pick-up region 11. In this region rivet elements 5 can be collected before separation in the pick-up region 11 for picking up by the handling unit 7 in order to supply these jointly to the pick-up region 11. In the exemplary embodiment the rivet element collecting region S has a flap 21a. This can be actuated here by means of an actuator 21b. Here the slide 21 comprises the flap 21a and the actuator 21b. By collecting and jointly supplying the rivet elements 5 to the pick-up region 11, the rivet elements 5 can be quickly supplied to the pick-up region 11 in a particularly simple manner and separated and picked up there. Here the rivet elements 5 are collected through the closed flap 21a and/or the combined supply of the collected rivet elements 5 to the pick-up region 11 by opening the flap 21a.

In various embodiments, rivet elements 5 from several, or all the spiral conveyors 8, are supplied to the pick-up region 11. Here the rivet elements 5 are supplied to the pick-up region 11 via a common slide 21. However, a plurality of slides 21 can be provided from different spiral conveyors 8 to the pick-up region 11. In some embodiments, however a plurality of spiral conveyors 8 convey rivet elements 5 to the pick-up region 11.

Additionally or alternatively to the opening 20 of the spiral pot receptacle 15, the spiral pot 14 can also have an opening for supplying the rivet elements 5 to the pick-up region 11.

The pick-up region 11 is here formed by a vibrating table 22. For the case where several rivet elements 5 are supplied simultaneously to the pick-up region 11, this also ensures a secure pick-up by the handling unit 7. Possibly, rivet elements 5 not lying separately in the pick-up region 11 can be separated or further separated by vibrational movements.

Furthermore a controller 23 can be provided for controlling the rivet element provision unit 6 and/or the handling unit 7. The controller 23 can be formed centrally or decentrally, i.e., it can either comprise a central control unit or several decentralized control units. In particular, the controller 23 can also be provided by the rivet machine 2.

The sensor 23 detects by means of a sensor arrangement 24, in particular an optical sensor 25, the position and/or alignment of the rivet elements 5 in the pick-up region 11. The optical sensor 25 can be arranged in the direction of gravity G above the pick-up region 11, in particular in a fixed position.

Additionally or alternatively, the sensor arrangement 24 can also comprise one or more checking units 26, 27, which are described in further detail hereinafter. In various embodiments, the sensor arrangement 24 and therefore possibly the optical sensor 25 or the checking unit 26, 27 is also here controlled by the controller 23.

By means of the optical sensor 25, the controller 23 in the exemplary embodiment can detect the position and/or alignment of the rivet elements 5 in the pick-up region 11.

For picking up the rivet elements 5, the controller 23 actuates the handling unit 7 for receiving, in particular, picking up a rivet element 5 based on the position and/or the alignment of the rivet elements 5. Alignment should be understood here as the orientation of the longitudinal axis of the rivet element 5, in particular including the orientation of its rivet head 5d. The handling unit 7 can then be adjusted corresponding to the position and alignment of the rivet element 5 so that its gripper can receive the rivet element 5.

By means of the sensor arrangement 24, in particular the optical sensor 25, the controller 23 can detect the genre, or the type, of a rivet element 5 provided by the rivet element provision unit 6, in particular in the pick-up region 11. It is thereby made possible to monitor the rivet elements 5, which will be described in further detail hereinafter.

From the pick-up region 11, the rivet elements 5 are supplied by means of the handling unit 7, such as individually to the rivet element receptacle 12, in an aligned manner, in particular in a stabilized position and are received by the rivet element receptacle 12 in an aligned manner, such as in a stabilized position. Only one rivet element receptacle 12 can be provided, but several rivet element receptacles 12 can be provided. In the exemplary embodiment, four rivet element receptacles 12 are shown.

The rivet element receptacle 12 or the rivet element receptacles 12 here has/have an intermediate store 28, in particular one in each case, for the intermediate storage of rivet elements 5. If several intermediate stores 28 are provided, these can form an intermediate storage arrangement. In the intermediate store 28 the rivet elements 5 can be stored in an aligned manner, in particular in a stabilized position.

In some embodiments, the intermediate store 28 has at least one or at least two sliders 29, 30 for blocking or releasing rivet elements 5 for conveying to the rivet machine 2, in particular to the rivet tool 2c. Two sliders 29, 30 enable a quite simple release of precisely one rivet element at the time for conveying to the rivet machine 2.

Furthermore, the intermediate store 28 can have level sensors 31a. Here a level sensor 31a is provided which detects when a predetermined level is reached and/or a level sensor 31a is provided, which detects when the level falls below a predetermined level of the intermediate store 28. The controller 23 controls the rivet element provision unit 6, at least also based on the level of the intermediate store 28. In the exemplary embodiment the level sensors 31a are arranged displaceably on the intermediate store 28 so that the fill level to be detected can be adjusted.

Figure 2:
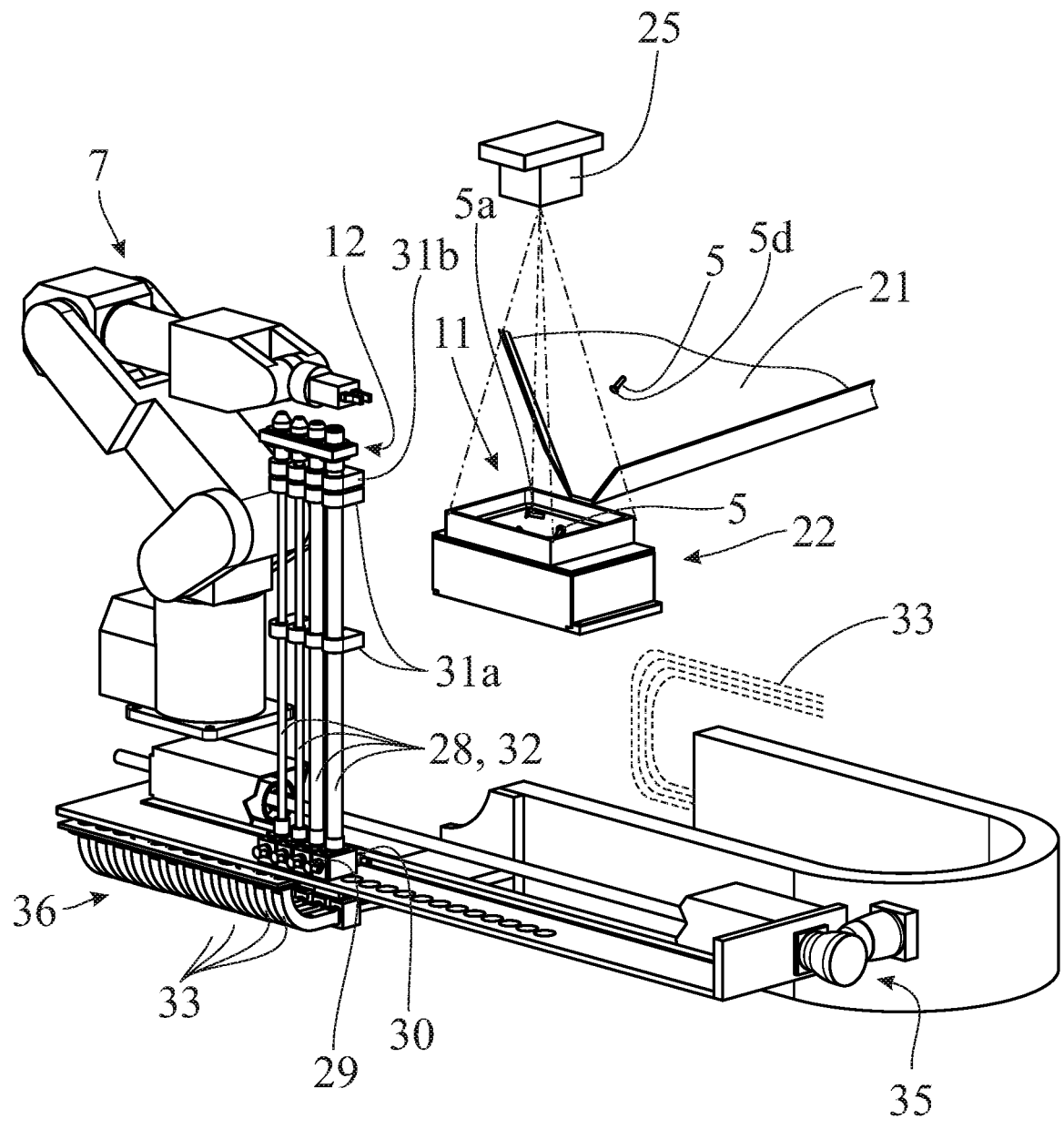
FIG. 2 shows a three-dimensional diagram of a part of the proposed rivet element supply unit according to viewing direction II from FIG. 1, as well as a rivet element receptacle of the manufacturing device.

In the exemplary embodiment of FIGS. 2 and 3 the intermediate store 28 is configured to be hose-like and/or tubular. This is shown in FIG. 2 where the intermediate stores 28 are formed by hoses 32. The level sensors 31a are here configured as inductive ring sensors. In this exemplary embodiment the rivet elements 5 are received by the rivet element receptacle or receptacles 12 and then supplied to the intermediate store 28.

In the exemplary embodiment of FIG. 5 an intermediate store 28 is also provided. Here a rivet element 5 is either supplied directly from the pick-up region 11 to the rivet element receptacle 12 or the rivet element 5 is initially supplied to the intermediate store 28. After it has been supplied to the intermediate store 28, it can be removed from the intermediate store 28 and supplied to the rivet element receptacle 12 at a later time point, in particular when it is needed.

The intermediate store 28 has one or more rivet element storage places 28a for individual rivet elements 5, in particular for individual stabilized-position storage of rivet elements 5. Here the handling unit 7 can individually fill the rivet element storage places 28a and/or supply rivet elements 5 from the rivet element storage places 28a to a rivet element receptacle 12, in particular for further transportation to the end effector 2b. The intermediate store 28 is here configured to be flat.

In various embodiments, it is stored in a store of the controller 23 which rivet element 5 or which type of rivet element 5 was deposited on which rivet element storage place 28a. By this means, the rivet element 5 can be easily removed by the handling unit 7 if required and supplied to the rivet element receptacle 12 for further transport to the end effector 2b.

In the exemplary embodiment of FIG. 5, various rivet element storage places 28a are combined in a rivet element storage module 28b. Here these rivet element receiving modules 28b are configured in a box-like manner, such as open at the top, and/or ex-changeably. The rivet elements 5 deposited there can then easily be exchanged and/or removed by exchanging the rivet element receiving module 28b. The base of the rivet element receiving module 28b can have a wave-shaped profile in cross-section. In the exemplary embodiment it is configured in the manner of a triangular wave in cross-section.

The sensor arrangement 24 can furthermore comprise an, in particular optical, sensor 28c for detecting position and alignment of the rivet elements 5 in the intermediate store 28. This can detect several rivet element receiving modules 28b.

Furthermore, a transfer sensor 31b can be provided which detects the transfer of a rivet element 5 to the rivet element receptacle 12. This can be an inductive ring sensor. This detects here the incidence of a rivet element 5 in the intermediate store 28.

Further transport of the rivet elements 5 to the rivet machine 2 is accomplished here, at least partially in a hose-bound manner. For this purpose a hose 33 or hoses 33 runs or run from the rivet element receptacle 12 or the rivet element receptacles 12 to the rivet machine 2. These form a transport section for the rivet elements 5. As already mentioned, at least a part of the transport section from the rivet element receptacle 12 to the rivet machine 2, in particular the adjusting unit and/or the end effector is hose-bound.

For stabilized-position transport of various rivet elements 5, the intermediate store 28 and/or hoses 33 here have different internal diameters at least in part.

On the transport section from the rivet element receptacle 12 or the intermediate store 28, a rivet switch 34 can further be provided, which enables different hoses 33 for transporting rivet elements 5 to the rivet machine 2 to be assigned to a rivet element receptacle 12. For this purpose the rivet switch 34 here comprises a linear drive 35 for moving a switch carriage 36. Here the linear drive 35 is configured as an electric motor with a spindle-spindle nut transmission.

This can be used to move the switch carriage 36 relative to the rivet element receptacles 12 in order to assign a hose 33 to a respective rivet element receptacle 12.

Figure 4:
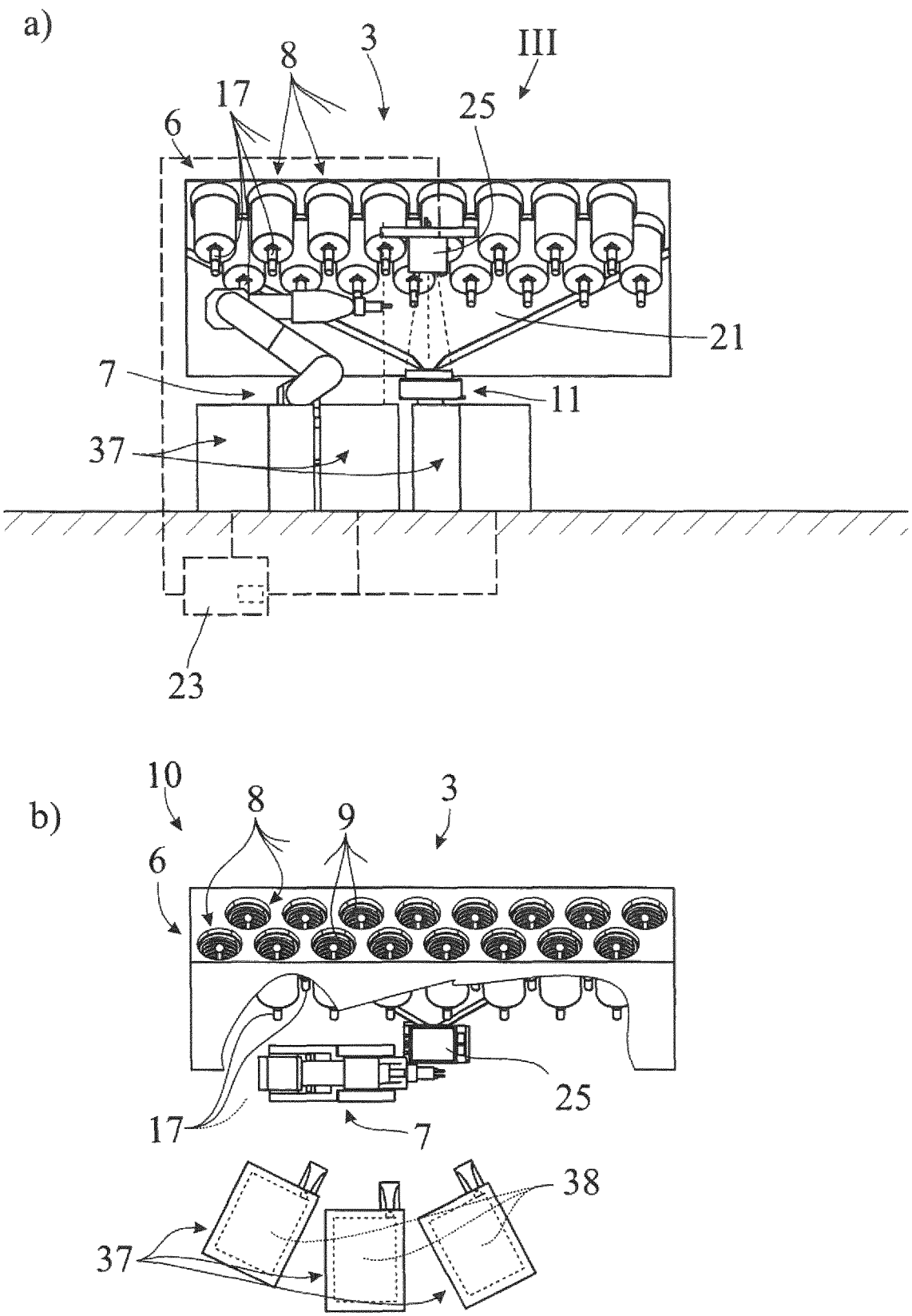

In the exemplary embodiment of FIG. 4 the rivet element supply unit 3 is part of a rivet loading station 1a. Here also the rivet elements 5 can be transported at least partially on the transport section from the pick-up region 11 to a rivet element receptacle 12 by means of the handling unit 7.

Here the rivet loading station 1a then has a rivet cassette receptacle 37 or several rivet cassette receptacles 37 for receiving a rivet cassette 38 or several rivet cassettes 38. The rivet cassette receptacle 37 and/or the rivet cassette 38 then can comprise the rivet element receptacle 12.

Here also an intermediate store can be provided for the intermediate storage of rivet elements. Furthermore a rivet switch can also be provided here. The intermediate store or the rivet switch can then be configured as described previously in connection with the manufacturing device 1.

By means of the sensor arrangement 24 the controller 23 can then monitor the rivet elements 5 before they are supplied to the rivet machine 2, in particular before they are supplied to the rivet element receptacle 12.

In some embodiments, the controller 23 monitors whether the type is a desired type to be inserted into one of the rivet element receptacles 12. In this way, a rivet element receptacle 12 or the rivet element receptacles 12 can only be supplied with those rivet elements 5 which correspond to the desired type.

In some embodiments, predetermined properties of the rivet elements 5, in particular of the rivet elements 5 as such, which are relevant for the drilling process and/or rivet process, are detected before supplying to the end effector 2b, in particular before supplying to the rivet element receptacle 12. In some embodiments, the predetermined properties relevant for the drilling process and/or the rivet process are geometrical properties of the rivet elements 5 and the controller 23 measures these properties by means of a sensor arrangement 24, in particular by means of an optical sensor 25 assigned to the sensor arrangement 24 and/or a checking unit 26, 27 assigned to the sensor arrangement 24. When subsequently making the rivet connection, this enables a matched drilling and/or riveting corresponding to the detected properties of the rivet element 5 and/or the selection of a rivet element 5 suitable for a drilling that has been carried out. In particular, head protrusions of a rivet element 5 beyond a predefined tolerance range can in this way be effectively avoided during manufacture by means of the manufacturing device 1.

The properties of the rivet elements 5 relevant for the drilling process and/or rivet process can be those properties on the basis of which the drilling process and/or rivet process is adapted in a rivet-element specific manner, in particular for rivet elements 5 of the same type or those properties on the basis of which the rivet element 5 is selected with respect to a rivet element 5 of the same type for a drilling that has been carried out.

Here the properties relevant for the drilling process and/or the rivet process can be the rivet length and/or the shaft diameter and/or the shaft length. These quantities are here detected by the sensor arrangement 24, in particular the sensor 25 directed to the pick-up region 11. For detection of properties of the rivet elements 5 to be detected by means of the optical sensor 25, in particular the properties rivet length and/or shaft diameter and/or shaft length, the controller 23 performs a transformation of the optical recording.

This is necessary since, for example, the rivet heads 5d of the rivet elements 5 here bring about a slight sloping position in the pick-up region 12.

The measurement tolerance of this measurement lies in the range of at least 500 µm, at least 200µ, or at least 100 µm.

In various embodiments the controller 23 can check by means of the sensor arrangement 24, in particular the optical sensor 25, the rivet elements 5 for damage. Here for example, it can be detected whether the rivet head 5d of a rivet element 5 is missing. The detection or checking of the rivet elements 5 by means of the optical sensor 25 directed to the pick-up region 12 is in this case can be accomplished before picking up the rivet element 5 by the handling unit 7.

As described previously, the manufacturing device 1 can further comprise a checking unit 26, 27 or several checking units 26, 27 for detecting predetermined properties of the rivet elements 5 relevant for the drilling process and/or the rivet process. The checking unit 25, 27 is here also controlled by the controller 23.

Furthermore, a rivet head diameter and/or a rivet head length and/or an angle of a rivet countersunk head and/or a transition radius can be measured and detected by means of the checking unit 26, 27 as predetermined properties relevant for the drilling process and/or the rivet process. A transition radius here is a radius between two sections of a rivet element 5, in particular between rivet head and shaft of a rivet. In addition, the shaft diameter can possibly also be determined. The measurement tolerance of the measurement with the checking unit 26, 27 can be lower, in particular at least a factor of 10 lower than the measurement tolerance in the measurement using the optical sensor 25 directed to the pick-up region 12.

In addition, the measurements using the optical sensor 25 directed onto the rivet element provision unit 6 using the checking unit 26, 27 differ in that using the optical sensor 25 directed onto the pick-up region 12, several rivet elements 5 are detected simultaneously and in particular completely whereas with the checking unit 26, 27 only one section of a rivet element 5 is detected.

In the exemplary embodiment the checking units 26, 27 are configured as a telecentric system on both sides. This allows a precise measurement without a precise positioning of the rivet element 5 in the checking unit 26, 27. The measurement tolerance of the checking unit 26, 27 can be less than +−5 less than +−3 or substantially +−2 µm.

The invention claimed is:

1. A manufacturing device comprising a rivet machine, wherein the manufacturing device comprises a rivet element supply unit for providing rivet elements and a rivet element receptacle,
   wherein the rivet element supply unit comprises a rivet element provision unit and a handling unit, wherein the handling unit is a robot,
   wherein the rivet element provision unit for conveying the rivet elements comprises a spiral conveyor having a longitudinal axis and a spiral, which extends around the longitudinal axis, wherein the longitudinal axis is inclined to the direction of gravity,
   wherein the rivet element provision unit has a pick-up region to which the spiral conveyor supplies rivet elements and from which the handling unit picks up the rivet elements for transporting to the rivet element receptacle,
   wherein at least a part of a transport section from the rivet receiving receptacle to the rivet machine comprises a hose.

2. The manufacturing device as claimed in claim 1, wherein the rivet element provision unit further comprises a plurality of spiral conveyors having a longitudinal axis, the spirals of which extend around their respective longitudinal axis, wherein the longitudinal axes of at least two spiral conveyors are inclined to the direction of gravity.

3. The manufacturing device as claimed in claim 2, wherein the rivet element provision unit has a slide via which the spiral conveyor or the spiral conveyors supply rivet elements to the pick-up region.

4. The manufacturing device as claimed in claim 1, wherein the spiral conveyor has a spiral pot for receiving rivet elements, in which the spiral is arranged.

5. The manufacturing device as claimed in claim 4, wherein the spiral pot and the spiral are configured in one piece and/or the spiral has a substantially constant radius.

6. The manufacturing device as claimed in claim 4, wherein the spiral conveyor has a spiral pot receptacle for receiving the spiral pot, wherein the spiral pot is arranged tool-free, detachably in the spiral pot receptacle.

7. The manufacturing device as claimed in claim 4, wherein a coupling is provided for the transmission of a rotary movement from a motor onto the spiral pot, wherein the spiral conveyor has a motor which drives the spiral pot.

8. The manufacturing device as claimed in claim 4, wherein the spiral conveyor and/or the spiral pot have an opening for supplying a rivet element to the pick-up region.

9. The manufacturing device as claimed in claim 1, wherein the pick-up region is formed by a vibrating table.

10. The manufacturing device as claimed in claim 1, wherein the handling unit has at least two rotational axes.

11. The manufacturing device as claimed in claim 1, comprising a controller for controlling the rivet element provision unit and/or the handling unit, wherein the controller is configured to detect by a sensor arrangement the position and/or alignment of the rivet elements in the pick-up region and on the basis of the position and/or alignment of the rivet elements the controller activates the handling unit to receive the rivet elements.

12. The manufacturing device as claimed in claim 1, wherein the rivet machine comprises an adjusting unit and an end effector, wherein the end effector comprises a rivet tool.

13. The manufacturing device as claimed in claim 1, wherein the rivet element receptacle receives the rivet elements, in an aligned manner and/or the rivet element receptacle comprises an intermediate store for intermediate storage of rivet elements.

14. The manufacturing device as claimed in claim 1, comprising a rivet switch on the transport section.

15. A method for providing rivet elements by the rivet element supply unit, as claimed in claim 1, wherein the rivet elements are conveyed by the spiral conveyor to a pick-up region and are picked up from the pick-up region by the handling unit for transporting to the rivet element receptacle.

16. A rivet loading station comprising a rivet element supply unit for providing rivet elements, and a rivet cassette receptacle for receiving a rivet cassette comprising a rivet element receptacle, wherein the rivet element supply unit comprises a rivet element provision unit and a handling unit, wherein the handling unit is a robot,
wherein the rivet element provision unit for conveying the rivet elements comprises a spiral conveyor having a longitudinal axis and a spiral, which extends around the longitudinal axis, wherein the longitudinal axis is inclined to the direction of gravity,
wherein the rivet element provision unit has a pick-up region to which the spiral conveyor supplies rivet elements and from which the handling unit picks up the rivet elements for transporting to the rivet element receptacle, and
wherein the rivet loading station is adapted to transport the rivet elements at least partially on a transport section from the pick-up region to the rivet element receptacle by the handling unit.

17. The rivet loading station as claimed in claim 16, wherein the rivet element receptacle receives the rivet elements, in an aligned manner, and/or the rivet element receptacle comprises an intermediate store for the intermediate storage of rivet elements.

18. The rivet loading station as claimed in claim 16, wherein the rivet element provision unit further comprises a plurality of spiral conveyors having a longitudinal axis, the spirals of which extend around their respective longitudinal axis, wherein the longitudinal axes of at least two spiral conveyors are inclined to the direction of gravity.

19. The rivet loading station as claimed in claim 18, wherein the rivet element provision unit further comprises a slide via which the spiral conveyor or the spiral conveyors supply rivet elements to the pick-up region.

20. The rivet loading station as claimed in claim 16, wherein the spiral conveyor has a spiral pot for receiving rivet elements, in which the spiral is arranged.

21. The rivet loading station as claimed in claim 20, wherein the spiral pot and the spiral are configured in one piece and/or the spiral has a substantially constant radius.

22. The rivet loading station as claimed in claim 20, wherein the spiral conveyor has a spiral pot receptacle for receiving the spiral pot, wherein the spiral pot, is arranged tool-free, detachably in the spiral pot receptacle.

23. The rivet loading station as claimed in claim 20, wherein a coupling is provided for the transmission of a rotary movement from a motor onto the spiral pot, wherein the spiral conveyor has a motor which drives the spiral pot.

24. The rivet loading station as claimed in claim 20, wherein the spiral conveyor and/or the spiral pot have an opening for supplying a rivet element to the pick-up region.

25. The rivet loading station as claimed in claim 16, wherein the pick-up region is formed by a vibrating table.

26. The rivet loading station as claimed in claim 16, wherein the handling unit has at least two rotational axes.

27. The rivet loading station as claimed in claim 16, comprising a controller for controlling the rivet element provision unit and/or the handling unit, wherein the controller is configured to detect by a sensor arrangement the position and/or alignment of the rivet elements in the pick-up region and on the basis of the position and/or alignment of the rivet elements the controller activates the handling unit to receive the rivet elements.

28. A rivet element supply unit for providing rivet elements, wherein the rivet element supply unit comprises a rivet element provision unit and a handling unit, wherein the handling unit is a robot,
wherein the rivet element provision unit for conveying the rivet elements comprises a spiral conveyor having a longitudinal axis and a spiral, which extends around the longitudinal axis, wherein the longitudinal axis is inclined to the direction of gravity, wherein the spiral conveyor has a spiral pot for receiving rivet elements, in which the spiral is arranged,
wherein the spiral conveyor has a spiral pot receptacle for receiving the spiral pot, wherein the spiral pot, is arranged tool-free, detachably in the spiral pot receptacle,
wherein the rivet element provision unit has a pick-up region to which the spiral conveyor supplies rivet elements and from which the handling unit picks up the rivet elements for transporting to a rivet element receptacle.

29. A rivet element supply unit for providing rivet elements, wherein the rivet element supply unit comprises a rivet element provision unit and a handling unit, wherein the handling unit is a robot,
wherein the rivet element provision unit for conveying the rivet elements comprises a spiral conveyor having a longitudinal axis and a spiral, which extends around the longitudinal axis, wherein the longitudinal axis is inclined to the direction of gravity,
the spiral conveyor has a spiral pot for receiving rivet elements, in which the spiral is arranged, wherein a coupling is provided for the transmission of a rotary movement from a motor onto the spiral pot, wherein the spiral conveyor has a motor which drives the spiral pot,
wherein the rivet element provision unit has a pick-up region to which the spiral conveyor supplies rivet elements and from which the handling unit picks up the rivet elements for transporting to a rivet element receptacle.

* * * * *